(12) United States Patent
Tsai et al.

(10) Patent No.: US 11,651,479 B2
(45) Date of Patent: May 16, 2023

(54) UNIFIED ISP PIPELINE FOR IMAGE SENSORS WITH VARIOUS COLOR FILTER ARRAY AND HIGH DYNAMIC RANGE SCHEMES

(71) Applicant: Advanced Micro Devices, Inc., Santa Clara, CA (US)

(72) Inventors: Chang-Che Tsai, Hsinchu (TW); Tsung-Han Chiang, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/131,570

(22) Filed: Dec. 22, 2020

(65) Prior Publication Data

US 2022/0198623 A1    Jun. 23, 2022

(51) Int. Cl.
  *G06T 3/40* (2006.01)
  *G06T 5/00* (2006.01)
  *G06T 5/50* (2006.01)

(52) U.S. Cl.
  CPC ............ *G06T 5/009* (2013.01); *G06T 3/4007* (2013.01); *G06T 3/4015* (2013.01); *G06T 5/50* (2013.01); *G06T 2207/20221* (2013.01)

(58) Field of Classification Search
  CPC ..... G06T 5/009; G06T 3/4007; G06T 3/4015; G06T 5/50; G06T 2207/20221
  See application file for complete search history.

(56) References Cited

U.S. PATENT DOCUMENTS

| | | | |
|---|---|---|---|
| 8,102,435 B2* | 1/2012 | Castorina | H04N 5/35554 348/222.1 |
| 2021/0243352 A1* | 8/2021 | McElvain | H04N 5/35554 |

* cited by examiner

*Primary Examiner* — Phuoc Tran
(74) *Attorney, Agent, or Firm* — Volpe Koenig

(57) ABSTRACT

An image processing method and an image processing device is provided. The processing device comprises memory and a processor configured to receive a frame of color filtered image data comprising pixels which are spatially multiplexed according to a plurality of different light exposures, resample the color values as different frames of pixels for the plurality of different light exposures, fuse the resampled frames of pixels for the plurality of different light exposures into a frame of pixels according to a HDR format and color interpolate the fused frame of pixels. The processor is configured to interpolate, for each resampled frame, missing pixel color values based on the color values of adjacent resampled pixels in a same resampled frame. The color interpolated fused frame of pixels is processed in an image processing pipeline and converted to a YUV color space.

20 Claims, 5 Drawing Sheets

UNIFIED ISP PIPELINE FOR IMAGE SENSORS WITH VARIOUS COLOR FILTER ARRAY AND HIGH DYNAMIC RANGE SCHEMES

BACKGROUND

Digital imaging uses image sensors comprised of individual photosensors which capture the intensity (i.e., brightness information) of the light received at each photosensor but which are not able to capture the selected wavelength (i.e., color information) of the light. Accordingly, image sensors are typically overlaid with a color filter array comprised of individual color filters to render the color information.

Each photosensor corresponds to a pixel of an image having a brightness value and color value used to represent the brightness and color of the light received at each photosensor. The color filter arrays cover the photosensors to capture the color information of the light received at each photosensor. The color values of the pixels are stored, as raw data (i.e., data, which is not interpolated, encoded or compressed), according to a variety of different RAW formats.

BRIEF DESCRIPTION OF THE DRAWINGS

A more detailed understanding can be had from the following description, given by way of example in conjunction with the accompanying drawings wherein.

DETAILED DESCRIPTION

Figure 1:
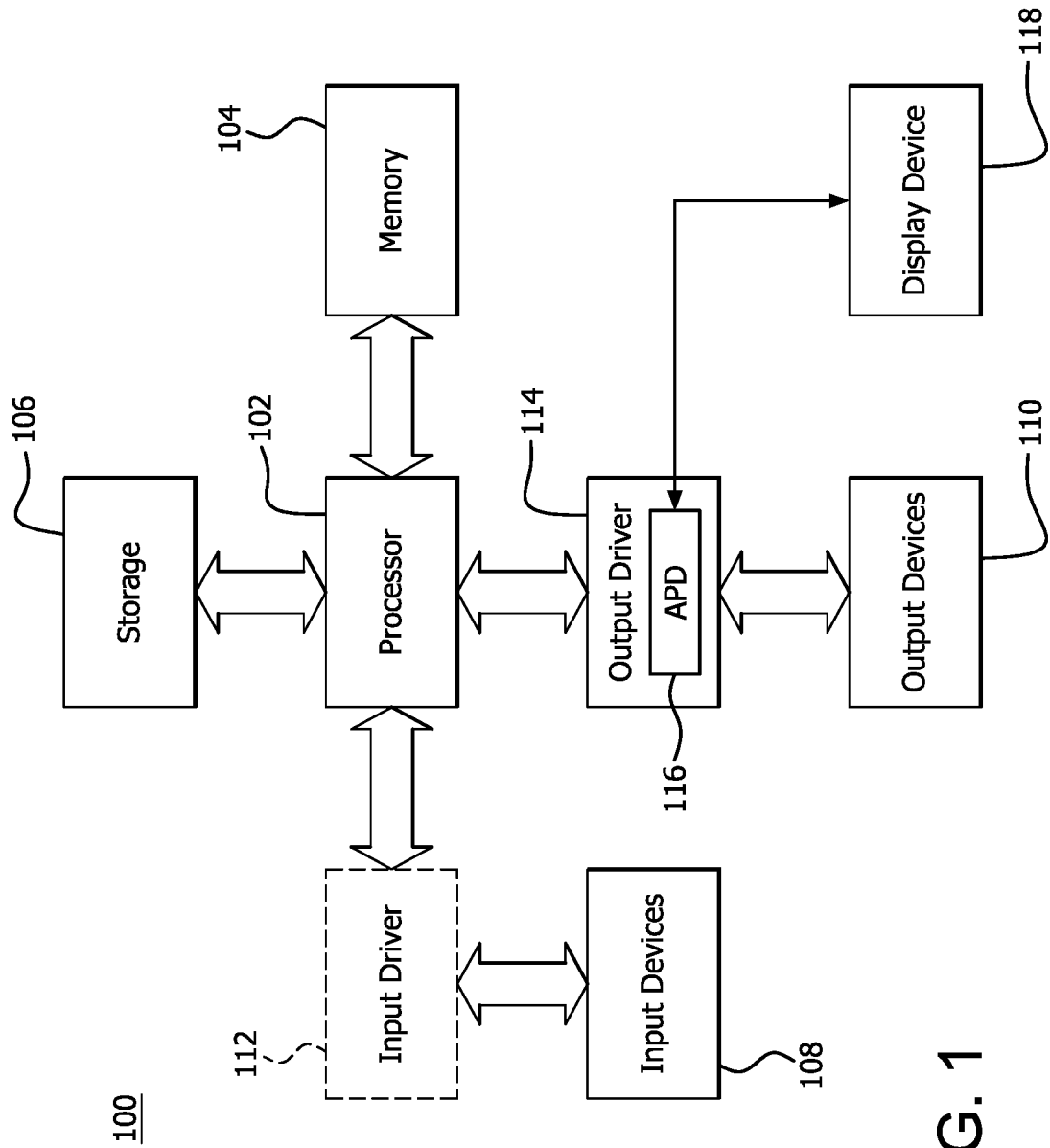
FIG. 1 is a block diagram of an example device in which one or more features of the disclosure can be implemented.

The input data of a conventional image signal processing (ISP) pipeline are frames of color filtered image data comprising pixels. Typical components of an ISP pipeline include color interpolation (i.e., interpolates RGB values for each pixel), color correction (i.e., correct color values), gamma correction (i.e., change from linear to non-linear space) and color space conversion (e.g., transform from a red-green-blue (RGB) color format to a YUV format). More complex ISP pipelines also include noise reduction, lens shading compensation, using a 3 dimensional look up table (3DLUT) for mapping color spaces, image sharpening, image cropping and image scaling. The YUV pixel data can be then compressed, transmitted, decoded and displayed, depending on the applications.

Image sensors can be implemented using a variety of color filter arrays, such as a Bayer color filter array, a RGB infra-red (IR) color filter array, a 4-cell RGB color filter array, a 9-cell RGB color filter array and a 16-cell RGB color filter array. Correspondingly, the output raw image of image sensors is color filtered data. For an ISP pipeline, the raw image color filtered data is then converted to a full-color image by a particular interpolation technique tailored to each type of color filter array. That is, the specific color interpolation technique used to interpolate the pixels depends on the particular color filter array used.

The dynamic range of an image sensor typically refers to a ratio between the highest light intensity and the lowest light intensity that an image sensor can accurately capture within the same frame (i.e., an image). To produce high dynamic range (HDR) images, digital imaging typically includes combining different exposures of image frames (i.e., images of the same subject matter but exposed to different amounts of light). For example, one technique for producing HDR images includes using time multiplexed exposure (TME). TME HDR images are produced by combining image frames of the same subject matter exposed to light for different amounts of time. For example, if two different exposures (e.g., long exposure and short exposure) are used, the HDR images are produced by combining an image of the subject matter exposed to light for a longer amount of time and an image of the same subject matter exposed to light for a shorter amount of time than the long exposure image. Any number of different exposures (e.g., long exposure, medium exposure and short exposure when 3 exposures are used) can be used to produce the HDR images.

The data from the different exposures can be processed frame by frame (i.e., frame HDR processing) or line by line (i.e., line HDR processing). For example, when frame HDR is implemented for two different exposures (e.g., long exposure and short exposure), the data is processed by alternating between the long exposure frames and the short exposure frames such that the data from a first frame with long exposure is processed, followed by the data from the first frame with short exposure, followed by the data from a second frame with long exposure, followed by the data from the second frame with short exposure, and so on.

When line HDR is implemented for two different exposures, the data is processed by alternating between the long exposure lines of a frame and the short exposure lines of a frame.

Accordingly, when TME HDR is used, the ISP pipeline includes combining (i.e., fusing) the long exposure and short exposure (e.g., frame by frame or line by line) into a single fused HDR representation of the images with larger pixel bit depths than each of the long exposure and short exposure representations. Then, the raw image color filtered data of the TME HDR images are converted to full-color images by the particular interpolation technique tailored to the corresponding type of color filter array used to produce the raw image color filtered data.

Alternatively, another technique for producing HDR images includes using spatial multiplexed exposure (SME) in which different exposures are applied per pixel. For example, if two exposures (i.e., long exposure and short exposure) are used, the long exposure RGB pixels are light red, light green and light blue, while the short exposure RGB pixels are dark red, dark green and dark blue. Then the mosaic pattern of the raw image color filtered data is re-mosaiced and the long exposure and short exposure are combined (i.e., fused) to produce a re-mosaiced, fused HDR representation of the image. The long and short exposure fused RGB pixels are HDR red, HDR green and HDR blue. Then, the raw image color filtered data of the re-mosaiced, fused HDR images are converted to full-color images by the particular interpolation technique tailored to the corresponding type of color filter array used to produce the raw image color filtered data.

Accordingly, when the images are filtered by a Bayer color filter array (i.e., producing a zig-zag pattern), a first technique is used to interpolate the pixels of the zig-zag re-mosaiced and fused HDR images. When the images are filtered by a 4-cell color filter (i.e., producing a 4-cell pattern), a second technique is used to interpolate the pixels of the 4-cell re-mosaiced and fused HDR images. When the images are filtered by a 9-cell color filter (i.e., producing a 9-cell pattern), a third technique is used to interpolate the pixels of the 9-cell re-mosaiced and fused HDR images. When the images are filtered by a 16-cell color filter (i.e., producing a 16-cell pattern), a fourth technique is used to interpolate the pixels of the 16-cell re-mosaiced and fused HDR images.

That is, the combination of many different types of color filter arrays and many different numbers of exposures for both TME and SME schemes result in a large number of different types of interpolation techniques to be used to accommodate each of the many combinations. Conventional ISP processing devices and methods are not able to efficiently process the image data produced from the combination of many different types of color filter arrays and many different numbers of exposures for both TME and SME schemes.

Features of the present disclosure include processing devices and methods which provide a unified image signal processing (ISP) pipeline to efficiently process the image data from various types of image sensors having different color filter array and high dynamic range (HDR) exposure schemes. Pixels of the raw image data (i.e., data, captured by an image sensor, which is not interpolated, encoded or compressed), which result from any of the various different types of image sensors, are resampled and missing pixels color values are interpolated for the R, G and B channels for each exposure to provide raw data in a Bayer format (i.e. Bayer color filter array format).

The raw data that is converted to Bayer format for the different exposures are then fused (i.e., HDR fused) into a single HDR Bayer image. The single HDR Bayer image is then interpolated, using a technique tailored to raw data in a Bayer format, processed and converted to YUV space. Accordingly, the compatibility of the components of the ISP pipeline is extended to a variety of different image sensors.

An image processing device is provided which comprises memory and a processor. The processor is configured to receive a frame of color filtered image data comprising pixels which are spatially multiplexed according to a plurality of different light exposures, resample the color values as different frames of pixels for the plurality of different light exposures, fuse the resampled frames of pixels for the plurality of different light exposures into a frame of pixels according to a HDR format (i.e. Bayer color filter array format with larger pixel bit depth to support high dynamic range) and color interpolate the fused frame of pixels.

An image processing method is provided which comprises receiving a frame of color filtered image data comprising pixels which are spatially multiplexed according to a plurality of different light exposures, resampling the color values as different frames of pixels for the plurality of different light exposures, fusing the resampled frames of pixels for the plurality of different light exposures into a frame of pixels according to a HDR format, and color interpolating the fused frame of pixels.

A non-transitory computer readable medium is provided which comprises instructions for causing a computer to execute an image processing method comprising receiving a frame of color filtered image data comprising pixels which are spatially multiplexed according to a plurality of different light exposures, resampling the color values as different frames of pixels for the plurality of different light exposures, fusing the resampled frames of pixels for the plurality of different light exposures into a frame of pixels according to a HDR format and color interpolating the fused frame of pixels.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
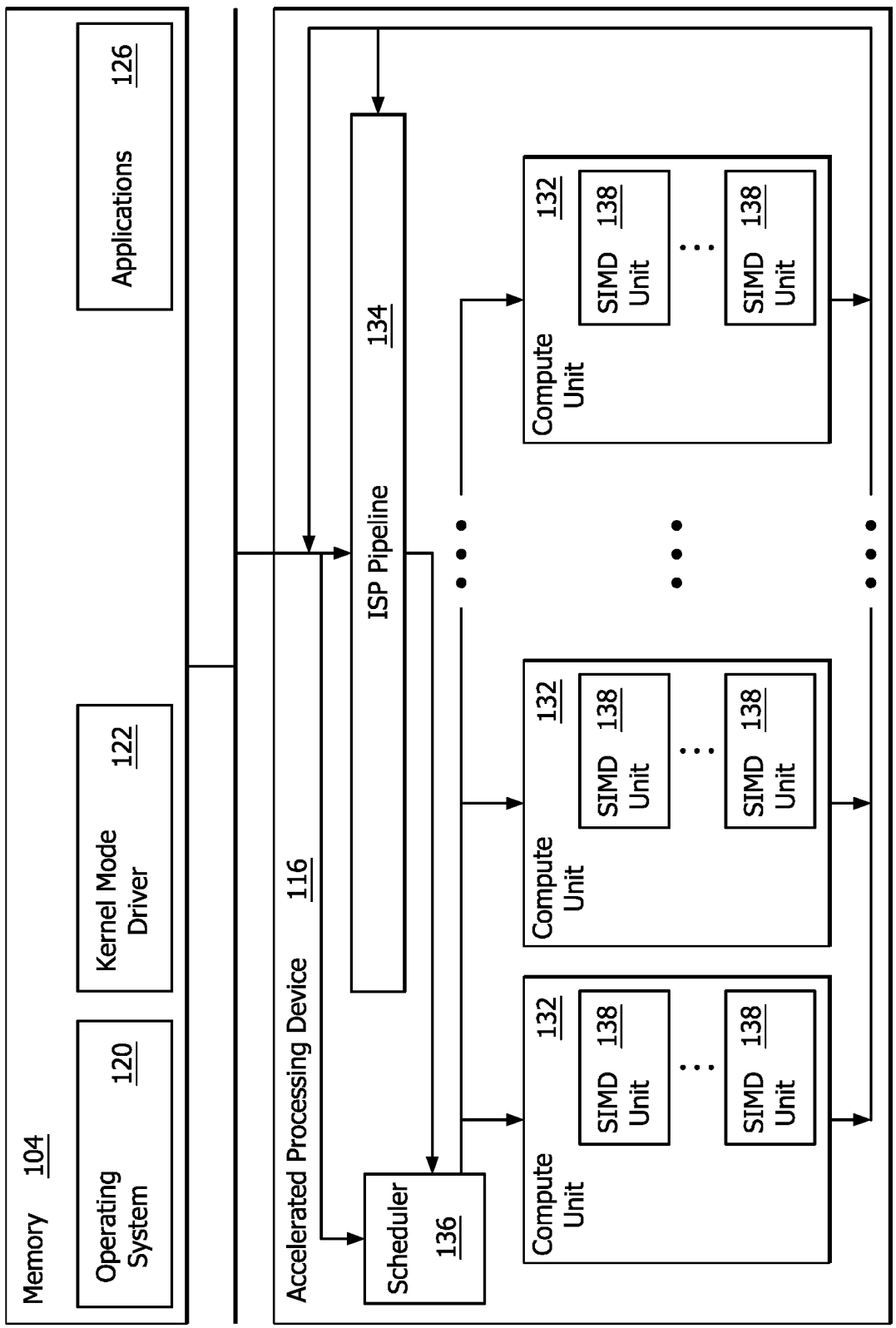
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as ISP operations and graphics operations that may be suited for parallel processing. The APD 116 can be used for executing ISP pipeline operations such as pixel operations (e.g., channel resampling and interpolation), geometric computations, and rendering an image to display device 118 based on commands received from the processor 102. The APD 116 also executes compute processing operations that are not directly related to ISP and graphics operations, such as operations related to physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for ISP and graphics related operations such as pixel value calculations, pixel value interpolation, vertex transformations, and other ISP and graphics operations. Thus in some instances, an ISP pipeline 134, which accepts ISP processing commands from the processor 102, provides computation tasks to the compute units 132 for execution in parallel.

The compute units 132 are also used to perform computation tasks not related to ISP and graphics or not performed as part of the "normal" operation of an ISP pipeline 134 (e.g., custom operations performed to supplement processing performed for operation of the ISP pipeline 134). An application 126 or other software executing on the processor 102 transmits programs that define such computation tasks to the APD 116 for execution.

Figure 3:
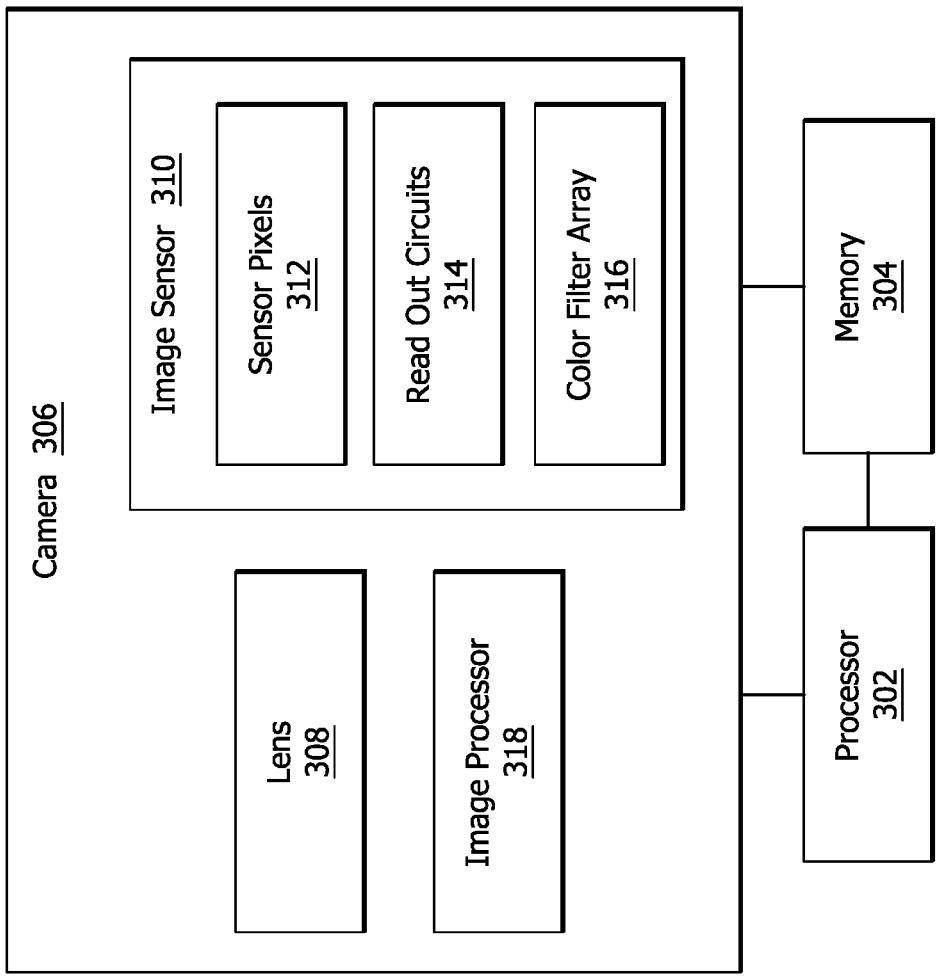
FIG. 3 is a block diagram illustrating example components of a processing device in which one or more features of the disclosure can be implemented.

FIG. 3 is a block diagram illustrating example components of a processing device 300 in which one or more features of the disclosure can be implemented. As shown in FIG. 3, processing device 300 includes processor 302, memory 304 and camera 306. Camera 306 includes lens 308, image sensor 310 and image signal processor 318. Image sensor 310 incudes of sensor pixels 312, read-out circuits 314 (e.g., including an analog to digital converter (ADC) circuit) and color filter array 316. Color filter array 316 includes any of a variety of color filter arrays, such as, for example, a Bayer color filter array, a RGB infra-red (IR) color filter array, a 4-cell RGB color filter array, a 9-cell RGB color filter array and a 16-cell RGB color filter array. In some examples, image processor 318 is integrated as part of processor 302, instead of camera 306.

Lens 308 includes a single lens or an assembly of lenses which collects light reflected from objects and/or light directly transmitted from illuminants. Image sensor 310 is, for example, a complementary metal-oxide-semiconductor (CMOS) based image sensor, which includes an array of cells, each corresponding to a pixel of an image (i.e., frame). Image sensor 310 is configured to expose the pixels to light passing through lens 308. The light passed through the corresponding color filter array 316 at each cell and captured at each cell is transformed into electrons having a value (i.e., an accumulated charge). The charge (i.e., analog value) of each cell is read out, during a read-out time, and sent to read out circuits 314, which converts the analog values into digital values.

Image processor 318 controls the exposure timing of the image sensor 310 (e.g., the delay time period between the exposures of each frame or between lines of a frame) such that time difference between the start of each readout time period is at least sufficient for the readout circuit to read out each line. The frame rate of the video is also controlled by controlling the exposure timing of the lines of each frame.

Processor 302 is configured to control both the exposure timing of the image sensor 310 (e.g., via image processor 318) and image processor 318. Processor 302 is also configured to perform a plurality of functions as described herein. For example, processor 302 is configured to receive frames of color filtered data comprising pixels which are spatially multiplexed according to a plurality of different light exposures, resample the color values as different frames of pixels for the plurality of different light exposures, fuse the resampled frames of pixels for the plurality of different light exposures into a frame of pixels according to a Bayer HDR format and color interpolate the fused frame of pixels. Processor 302 is also configured to interpolate missing pixel color values based on the color values of adjacent resampled pixels in a same resampled frame (i.e. the adjacent pixels of the same exposure in the same frame).

Figure 4:
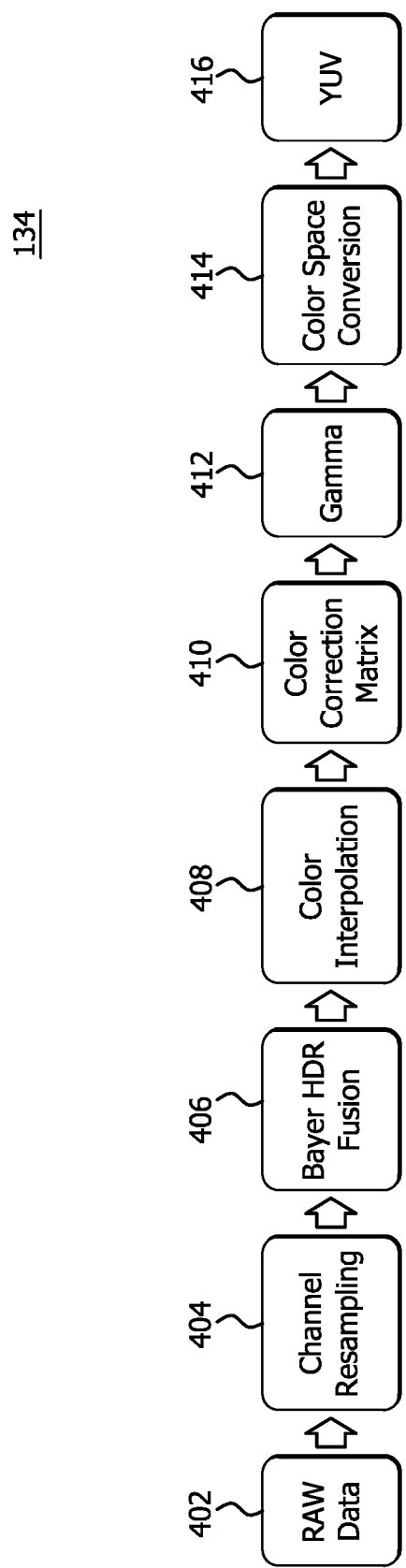
FIG. 4 is a block diagram illustrating an example flow of processing images via an ISP pipeline according to features of the present disclosure.

FIG. 4 is a block diagram illustrating an example flow of processing images via an ISP pipeline 134 according to features of the present disclosure. As shown at block 402 of FIG. 4, raw image data is received at the pipeline 134. The raw image data is color filtered data resulting from an image sensor (e.g., image sensor 310) comprising any one of a variety of different color filter arrays, such as, for example, a Bayer color filter array, a RGB infra-red (IR) color filter array, a 4-cell RGB color filter array, a 9-cell RGB color filter array and a 16-cell RGB color filter array.

Figure 5:
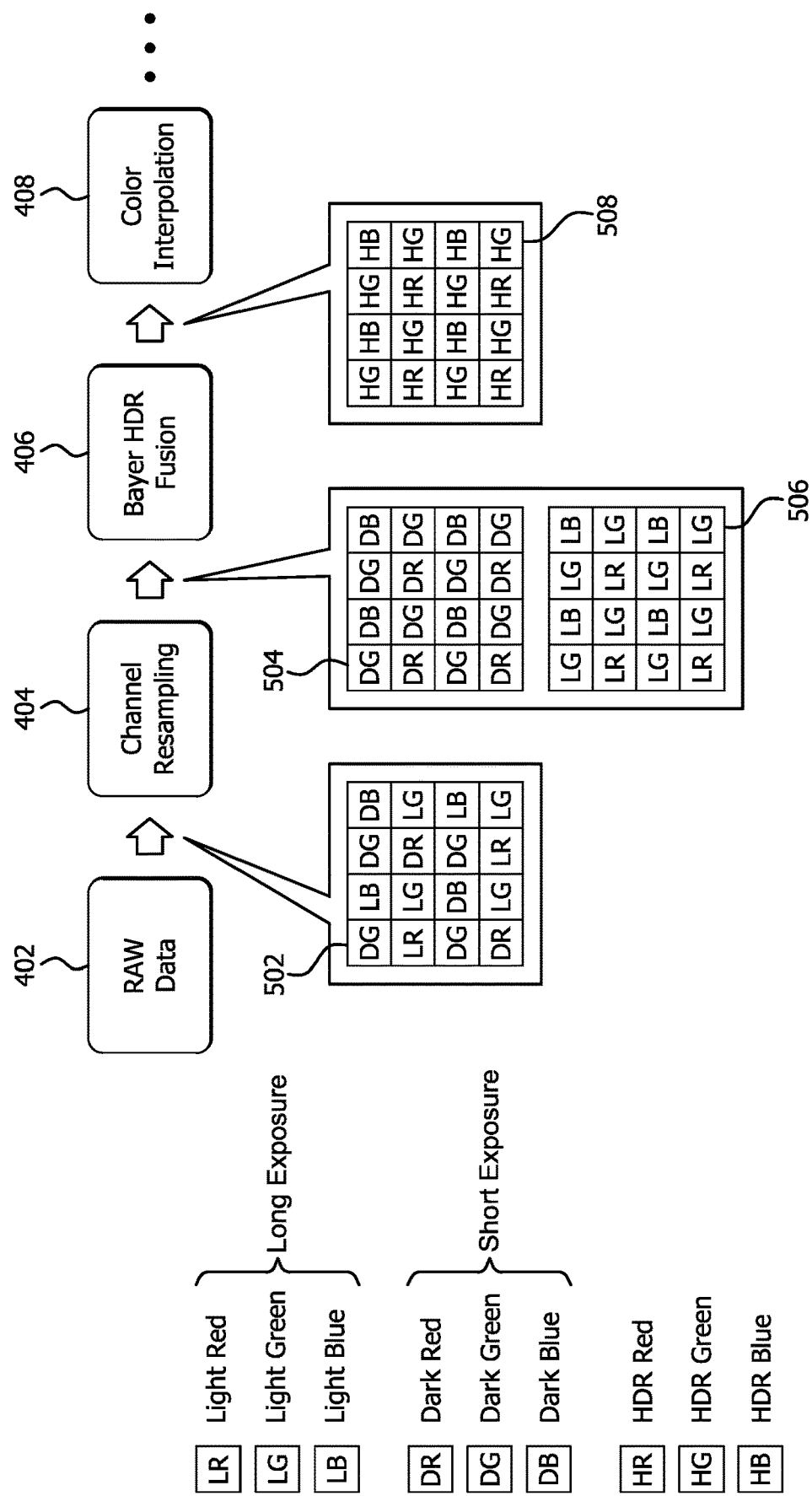
FIG. 5 is a block diagram illustrating processing components of the ISP pipeline shown in FIG. 4, with additional detail.

The raw image data is channel resampled, as shown at block 404, and Bayer HDR fused at block 406. FIG. 5 is a block diagram illustrating an example of the channel resampling and Bayer HDR fusion components, shown at blocks 404 and 406 in FIG. 4, with additional detail.

For simplified explanation purposes, in the example shown at FIG. 5, two exposures (e.g., long exposure and short exposure) are used to produce HDR images. Features of the present disclosure can be implemented, however, using any number of different exposures to produce the HDR images.

The raw data of the pixel color values received, at block 402, is subject to SME and is represented as a zig-zag pattern 502 of pixel color values resulting from color filtering of a Bayer color filter array. The pattern of pixel color values representing the raw data shown in FIG. 5 is, however, merely an example of raw data to be converted according to features of the present disclosure. Features of the present disclosure can be implemented from raw data represented in any of a variety of pixel value patterns produced from image sensors comprising any one of a variety of color filter arrays. Further, in the example shown at FIG. 5, 4×4 blocks of pixels are used, for simplified explanation purposes, to illustrate resulting pixel patterns at different points in the ISP pipeline 134.

In FIG. 5, the raw data produced by the color filter array of the image sensor results in a zig-zag pattern 502 of pixel color values. The pixels are spatially multiplexed exposured (i.e., the light exposure is varied on a per pixel basis) such that the color values of pixels subject to the long exposure result in a light color (i.e., light red, light blue, or light green). The color values of pixels subject to the short exposure result in a dark color (i.e., dark red, dark blue, or dark green). For example, for the first pixel in the first row of the zig-zag pattern 502, the green (G) color value of the pixel results in a dark green color due to the pixel being subject to the short exposure. For the second pixel in the first row of the zig-zag pattern 502, the blue (B) color value of the pixel results in a light blue color due to the pixel being subject to the long exposure. For the first pixel in the second row of the zig-zag pattern 502, the red (R) color value of the pixel results in a light red color due to the pixel being subject to the long exposure.

Referring to block 404, each channel (i.e., RGB channels) of the pixels in the zig-zag pattern 502 are channel resampled for both exposures (i.e., the long exposure and the short exposure), resulting in the resampled Bayer formatted pattern 504 for the short exposure and the resampled Bayer formatted pattern 506 for the long exposure. The color values (i.e., R or G or B color values) of missing pixels for each exposure are interpolated from the color values of adjacent pixels with the same exposure (i.e., the long exposure and the short exposure).

For example, the colors of the first, third and fourth pixels in the first row of the resampled pattern 504 for the short exposure are represented by the same dark green color, dark green color and dark blue color, respectively, because the corresponding (co-located) pixels in the zig-zag pattern 502 were subject to the short exposure. The color value of the second pixel in the first row of the resampled pattern 504 for the short exposure is not reproduced with the same dark blue color, however, because the color of the corresponding (co-located) pixel in the zig-zag pattern 502 resulted from being subject to the long exposure. Instead, the color value of the second pixel in the first row of the resampled pattern 504 is interpolated from the color values of adjacent pixels the resampled pattern 504. In this case, because the color values of adjacent pixels in the resampled pattern 504 are dark colors, the color value of the second pixel in the first row is interpolated as dark blue in the resampled pattern 504 instead of the light blue color value of the corresponding (co-located) pixel in the zig-zag pattern 502.

Likewise, because the first pixel in the second row was also subject to the long exposure, the same color value of the first pixel in the second row is not reproduced in the resampled pattern 504 for the short exposure. Instead, the color value of the first pixel in the second row of the resampled pattern 504 for the short exposure is interpolated from the color values of adjacent pixels in the resampled pattern 504. In this case, because the color values of adjacent pixels in the resampled pattern 504 are dark colors, the color value of the first pixel in the second row is interpolated as dark red in the resampled pattern 504 instead of the light red color value of the corresponding (co-located) pixel in the zig-zag pattern 502.

In contrast, the color value of the second pixel in the first row of the resampled pattern 506 for the long exposure is represented by the same light blue color because the corresponding (co-located) pixel in the zig-zag pattern 502 was subject to the long exposure. The color values of the first, third and fourth pixels in the first row of the resampled pattern 506 for the long exposure are not reproduced with the light green color, light green color and light blue color, respectively, because the color of the corresponding (co-located) pixels in the zig-zag pattern 502 resulted from being subject to the short exposure.

The resulting resampled Bayer formatted pattern 504 for the short exposure and the resampled Bayer formatted pattern 506 for the long exposure are then Bayer HDR fused, at block 406, into a single HDR Bayer pattern 508 of raw data, in which the color values of the pixels are represented with larger pixel bit depths than pixel color values of the raw data pattern 502. The pixels in the HDR Bayer pattern 508 are then efficiently color interpolated, at block 408, using a color interpolation technique tailored to raw data in a Bayer format.

After the HDR Bayer pattern 508 is color interpolated, the pixels are then processed according to the components of the ISP pipeline 410, 412, 414 and 416 shown in FIG. 4. That is, the pixels are color corrected, at block 410 and gamma corrected at block 412. Color space conversion is then performed at block 414 to convert the pixels from RGB color space to a YUV color space at block 416. In more sophisticated ISP pipeline, additional image processing blocks can be added to the ISP pipeline 134 (e.g., added between any two of the blocks: 402, 404, 406, 408, 410, 412, 414, and 416 in ISP pipeline 134).

The images are then transmitted, decoded and displayed on a display device, such as display device 118 shown in FIG. 1.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, 302, 318, the input driver 112, the input devices 108, the output driver 114, the output devices 110, the accelerated processing device 116, the scheduler 136, the graphics processing pipeline 134, the compute units 132, the SIMD units 138, the camera 306 and image sensor 310 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An image processing device comprising:
   memory; and
   a processor configured to:
   for a frame of color filtered image data comprising pixels which are spatially multiplexed according to a first light exposure and a second light exposure different from the first light exposure:
   resample the pixels as a first resampled frame of pixels each representing color values subject to the first light exposure and a second resampled frame of pixels each representing color values subject to the second light exposure;
   fuse the first resampled frame of pixels subject to the first light exposure and the second resampled frame of pixels subject to the second light exposure into a fused frame of pixels according to a high dynamic range (HDR) format; and
   color interpolate the fused frame of pixels.

2. The image processing device of claim 1, wherein the processor is further configured to interpolate, for each resampled frame, missing pixel color values based on the color values of adjacent resampled pixels in a same resampled frame.

3. The image processing device of claim 1, wherein the color values of the frames of pixels are each represented by one of a plurality of different color primitives.

4. The image processing device of claim 1, wherein the HDR format is a Bayer HDR format.

5. The image processing device of claim 4, wherein the color interpolated fused frame of pixels is processed in an image processing pipeline and converted to a YUV color space.

6. The image processing device of claim 5, further comprising a display device, wherein the color interpolated fused frame of pixels that is converted to the YUV color space is displayed at the display device.

7. The image processing device of claim 1, wherein the color values of the fused frame of pixels are represented with larger pixel bit depths than color values of the pixels of the received frame of color filtered data.

8. The image processing device of claim 1, further comprising an image sensor configured to capture an image according to the first light exposure and the second light exposure, the image sensor comprising a color filter array.

9. The image processing device of claim 8, wherein the color filter array is one of a Bayer color filter array, a red, green, blue (RGB) and infra-red (IR) color filter array, a 4-cell RGB color filter array, a 9-cell RGB color filter array and a 16-cell RGB color filter array.

10. An image processing method comprising:
    for a frame of color filtered image data comprising pixels which are spatially multiplexed according to a first light exposure and a second light exposure different from the first light exposure:
    resampling the pixels as a first resampled frame of pixels each representing color values subject to the first light exposure and a second resampled frame of pixels each representing color values subject to the second light exposure;
    fusing the first resampled frame of pixels subject to the first light exposure and the second resampled frame of pixels subject to the second light exposure into a fused frame of pixels according to a high dynamic range (HDR) format; and
    color interpolating the fused frame of pixels.

11. The method of claim 10, further comprising interpolating, for each resampled frame, missing pixel color values based on the color values of adjacent resampled pixels in a same resampled frame.

12. The method of claim 10, wherein the color values of the frames of pixels are each represented by one of a plurality of different color primitives.

13. The method of claim 10, wherein the HDR format is a Bayer HDR format.

14. The method of claim 13, wherein the color interpolated fused frame of pixels is processed in an image processing pipeline and converted to a YUV color space.

15. The method of claim 14, wherein the color interpolated fused frame of pixels that is converted to the YUV color space is displayed at a display device.

16. The method of claim 10, wherein the color values of the fused frame of pixels are represented with larger pixel bit depths than color values of the pixels of the received frame of color filtered data.

17. The method of claim 10, wherein the color filtered image data is color filtered according to one of a Bayer color filter array, a red, green, blue (RGB) and infra-red (IR) color filter array, a 4-cell RGB color filter array, a 9-cell RGB color filter array and a 16-cell color RGB filter array.

18. A non-transitory computer readable medium comprising instructions for causing a computer to execute an image processing method, the instructions comprising:

for a frame of color filtered image data comprising pixels which are spatially multiplexed according to a first light exposure and a second light exposure different from the first light exposure:

resampling the pixels as a first resampled frame of pixels each representing color values subject to the first light exposure and a second resampled frame of pixels each representing color values subject to the second light exposure;

fusing the first resampled frame of pixels subject to the first light exposure and the second resampled frame of pixels subject to the second light exposure into a fused frame of pixels according to a high dynamic range (HDR) format; and color interpolating the fused frame of pixels.

19. The non-transitory computer readable medium of claim 18, wherein the instructions further comprise interpolating, for each resampled frame, missing pixel color values based on the color values of adjacent resampled pixels in a same resampled frame.

20. The non-transitory computer readable medium of claim 18, wherein the color values of the frames of pixels are each represented by one of a plurality of different color primitives.

* * * * *